United States Patent
Vedrine

(10) Patent No.: US 6,997,445 B2
(45) Date of Patent: Feb. 14, 2006

(54) METHOD AND DEVICE FOR INTRODUCING A LIQUID-VAPOR MIXTURE INTO A RADIAL FEED CYLINDRICAL FRACTIONATING COLUMN

(75) Inventor: Denis Vedrine, Le Havre (FR)

(73) Assignee: Total Raffinage Distribution S.A., Puteaux (FR)

( * ) Notice: Subject to any disclaimer, the term of this patent is extended or adjusted under 35 U.S.C. 154(b) by 0 days.

(21) Appl. No.: 10/201,946

(22) Filed: Jul. 25, 2002

(65) Prior Publication Data
US 2003/0029778 A1 Feb. 13, 2003

(30) Foreign Application Priority Data
Jul. 26, 2001 (FR) ................... 01 09993

(51) Int. Cl.
*B01F 3/04* (2006.01)
(52) U.S. Cl. ......................... 261/96; 261/109
(58) Field of Classification Search ................ 261/96, 261/102, 105, 109; 208/347; 202/153
See application file for complete search history.

(56) References Cited

U.S. PATENT DOCUMENTS

| | | | |
|---|---|---|---|
| 4,664,784 A * | 5/1987 | Harandi ....................... 208/354 |
| 4,753,721 A * | 6/1988 | McDaniel et al. ........... 208/143 |
| 4,770,747 A * | 9/1988 | Muller ......................... 202/176 |
| 4,810,428 A * | 3/1989 | Aly et al. ...................... 261/96 |
| 5,106,544 A * | 4/1992 | Lee et al. .................. 261/79.2 |
| 5,230,839 A * | 7/1993 | Sampath et al. ............ 261/110 |
| 5,516,465 A | 5/1996 | Yeoman |
| 5,558,818 A * | 9/1996 | Gohara et al. ................ 261/17 |
| 5,605,654 A * | 2/1997 | Hsieh et al. ............... 261/79.2 |
| 5,632,933 A * | 5/1997 | Yeoman et al. ............. 261/109 |
| 5,925,293 A * | 7/1999 | Howk ......................... 261/93 |
| 6,341,765 B1 * | 1/2002 | Moser ......................... 261/96 |
| 6,386,520 B1 * | 5/2002 | McEwan ................. 261/114.1 |
| 6,488,899 B1 * | 12/2002 | Gohara et al. .............. 422/171 |

FOREIGN PATENT DOCUMENTS

| | | |
|---|---|---|
| DE | 17 94 104 | 12/1970 |
| FR | 1 483 111 | 6/1967 |
| GB | 2 259 025 | 3/1993 |

OTHER PUBLICATIONS

French Search Report.

* cited by examiner

*Primary Examiner*—Scott Bushey
(74) *Attorney, Agent, or Firm*—Sughrue Mion, PLLC

(57) ABSTRACT

A method and device for introducing a liquid-vapor mixture into a radial feed cylindrical fractionating column (1). The method includes separating the liquid-vapor mixture into two opposite and horizontal flows (6, 7), and directing the flows toward the lower part (4) of the column (1) to reduce the entrainments of liquid toward the upper part (5) of the column. The device includes elements (9a, 9b) for separating the liquid-vapor mixture into two opposite and horizontal flows and elements for directing the flows toward the lower section of the column. The elements cooperate to reduce the entrainment of liquid toward the upper section of the column. The method and device can be applied in the oil industry, namely in crude oil refineries as well as in chemistry and petrochemistry.

5 Claims, 4 Drawing Sheets

METHOD AND DEVICE FOR INTRODUCING A LIQUID-VAPOR MIXTURE INTO A RADIAL FEED CYLINDRICAL FRACTIONATING COLUMN

FIELD OF THE INVENTION

This invention relates to a method and device for introducing a liquid-vapor mixture into a radial feed cylindrical fractionating column.

It finds its application in the oil industry, namely in crude oil refineries as well as in chemistry and petrochemnistry.

STATE OF THE PRIOR ART

Typically, crude oil or heavy hydrocarbon atmospheric and vacuum fractionating columns are comprised in their upper section of a washing area, called "wash-zone", in their lower section of an enriching area, called "stripping zone", and in their middle section of an area called "flash zone" in which a liquid-vapor mixture to be distilled is introduced.

When the separation of the vapor and liquid phases in the flash zone is incomplete, droplets of liquid are entrained with the vapor into the wash zone.

These entrainments of droplets result in the formation of coke on the plateaus that equip the columns.

Said entrainments may also cause the blackening of the product of the distillation as is the case with gas oils at the output of atmospheric fractionating columns of viscosity breaking units.

To limit said entrainments, it is known to introduce the liquid-vapor charge into the column through an entry horn connected to the tangential inlet conduit of said charge.

This horn, placed inside the column, takes on the shape of the arc of circle of the column's internal wall.

It forms a conduit, that comprises an inside wall and an outside wall linked by an upper plate, with a first closed extremity and a second open extremity linked to the liquid-vapor mixture's inlet conduit.

Inside this horn, between the inner and outer walls, are mounted several deflectors whose upper vertical sections are curved.

Said deflectors are offset vertically higher and higher up between the open entry of the horn and its closed extremity.

The objective sought is for the vapor and the liquid that make up the column's charge to come into contact with the deflectors and be directed downward through the open bottom of the horn, from where the vapor moves back up towards the wash zone while the liquid flows toward the bottom in the stripping zone.

An improvement of said device is described in the American patent U.S. Pat. No. 4,770,747, which consists in mounting, inside the horn, deflectors that direct the liquid portion of the column's charge horizontally toward the column's wall and the vapor portion toward the stripping zone.

Said improved device cannot be used with radial feed columns.

SUMMARY OF THE INVENTION

The object of this invention is precisely to remedy this disadvantage and provide a method and device that can be used with radial feed cylindrical fractionating columns, in order to reduce the entrainment of droplets toward the upper sections of said columns.

With this end in view, it proposes a method for introducing a liquid-vapor mixture into a radial feed cylindrical fractionating column, comprised of a lower section and an upper section, that consists in separating the liquid-vapor into two opposite and horizontal flows then in directing said flows toward the lower section of the column.

It also proposes a device for introducing a liquid-vapor mixture into a radial feed cylindrical fractionating column, comprised of a lower section and an upper section, a device that is comprised of means for separating the liquid-vapor mixture into two opposite horizontal flows and means for directing said flows towards the lower section of the column, where said means cooperate to reduce the entrainments of liquid toward the upper section of the column.

According to another characteristic of the invention's device, the liquid vapor mixture arriving through a radial feed conduit, the means for separating the liquid vapor mixture comprises a T shaped deflection box, equipped with an entry, a first and a second exit, symmetrical, where said deflection box is connected at its entry to the feed conduit and mounted in such a way that the flows that pass through the first and the second exit make up the two opposite horizontal liquid vapor mixture flows.

In one embodiment, the means for directing the flows are comprised of a first distribution horn in the shape of an arc of circle, with an open upstream extremity and bottom, arranged horizontally along the inner wall of the column, a second distribution horn in the shape of an arc of circle, with an open upstream extremity and bottom, arranged horizontally along the inner wall of the column, where this first and this second horn are placed symmetrically in relation to the vertical plane that passes through the axis of the feed conduit, where the upstream extremity of the first distribution horn and the upstream extremity of the second distribution horn are connected respectively to the means for separating the flow of liquid-vapor mixture.

In another embodiment, the means for directing the flows are comprised of a first distribution horn in the shape of an arc of circle, with an open upstream extremity and bottom, arranged along the inner wall of the column and directed downward, a second distribution horn in the shape of an arc of circle with an open upstream extremity and bottom, arranged along the inner wall of the column and directed downward, where said first and said second horn are placed symmetrically in relation to the vertical plane that passes through the axis of the feed conduit, where the upstream extremity of the first distribution horn and the upstream extremity of the second distribution horn are connected respectively to the means for separating the flow of liquid-vapor mixture. According to a third embodiment, the means for directing the flows are comprised of a first distribution horn in the shape of an arc of circle, with an open upstream extremity and a closed bottom containing several openings, arranged horizontally along the inner wall of the column, a second distribution horn in the shape of an arc of circle with an open upstream extremity and a closed bottom that contains several openings, arranged horizontally along the inner wall of the column, where this first and this second horn are placed symmetrically in relation to the vertical plane that passes through the axis of the feed conduit, the upstream extremity of the first distribution horn and the upstream extremity of the second distribution horn are linked respectively to the means for separating the flow of liquid vapor mixture.

Lastly, in a fourth embodiment, the means for directing the flows are comprised of a first distribution horn in the shape of an arc of circle, with an open upstream extremity and a closed bottom that contains several openings, arranged along the inner wall of the column and directed downward, a second distribution horn in the shape of an arc of circle with an open upstream extremity and a closed bottom that contains several openings, arranged along the inner wall of the column and directed downward, where this first and this second horn are placed symmetrically in relation to the vertical plane that passes through the axis of the feed conduit, where the upstream extremity of the first distribution horn and the upstream extremity of the second distribution horn are connected respectively to the means for separating the flow of liquid vapor mixture.

According to one characteristic of the invention's device, the latter is also comprised of a flow separator placed inside the deflection box, in the axis of the feed conduit so as to improve the separation into two flows of the liquid vapor mixture.

According to another characteristic of the invention's device, the first and second horns contain several deflection elements mounted between their lateral walls, arranged so that each of them deviates a portion of the liquid toward the bottom of each horn, to evenly distribute the fluid inside the column.

Still according to one characteristic of the invention's device, the distribution horns contain several deflectors whose upper edges are curved, where said deflectors are arranged so that their edges trailing edges are sloped at an angle of less than 45 degrees in relation to the vertical line.

Lastly, according to a last characteristic of the invention's device, the transition surface of the liquid vapor mixture through the bottom of each distribution horn is between 0.8 and 3 times the surface of the right section of the feed conduit.

BRIEF DESCRIPTION OF THE DRAWINGS

The invention will be better understood with the help of the attached drawings where.

DETAILED DISCLOSURE OF THE INVENTION

Figure 1:
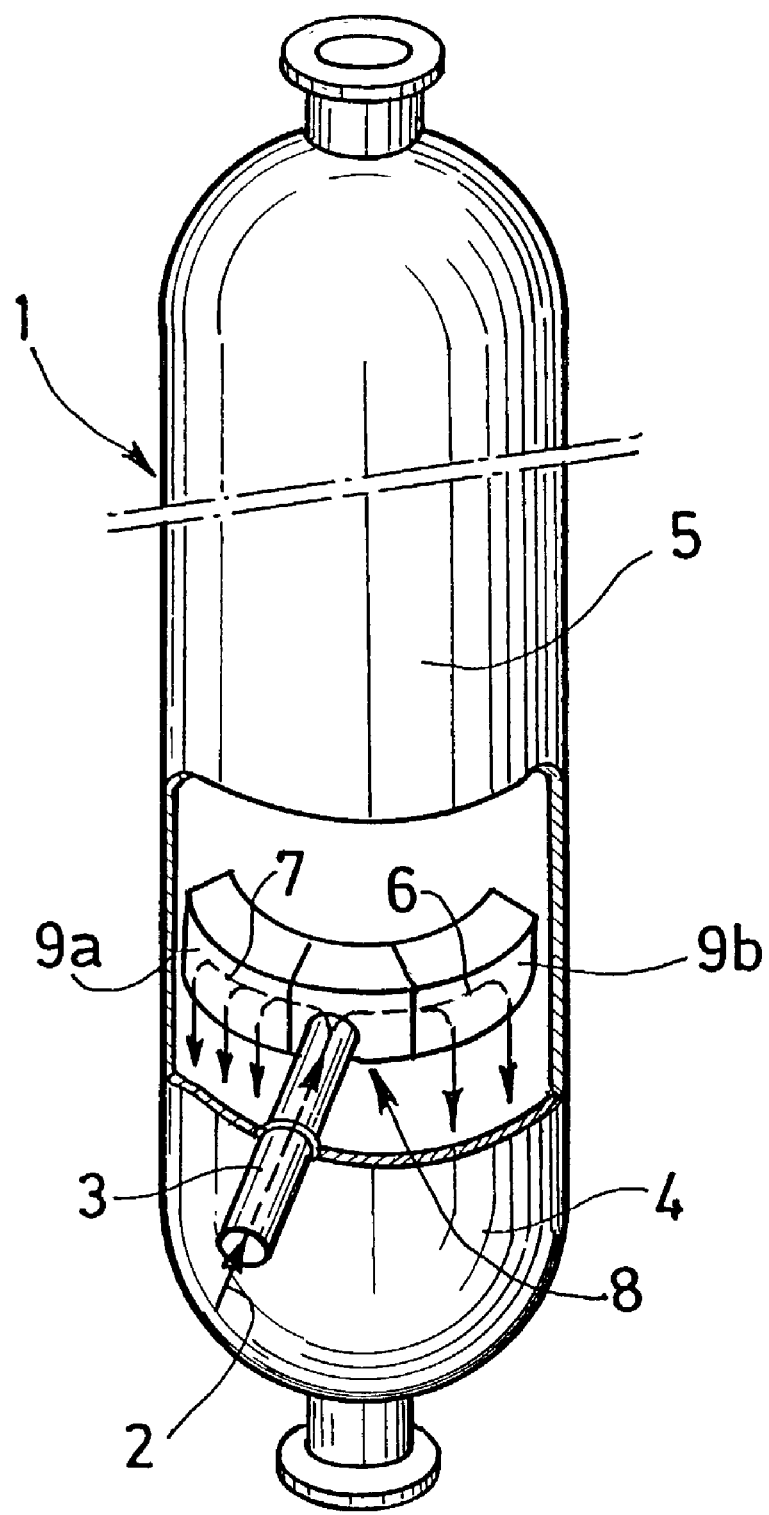
FIG. 1 represents a fractionating column equipped with a device that is consistent with the invention.

FIG. 1 represents, in a partially cut view, a cylindrical fractionating column 1 equipped with a device for introducing a liquid vapor mixture 2 to be distilled.

The liquid vapor mixture 2 arrives through the radial feed conduit 3 located between the upper section 5 of the column and the lower section 4. The radial feed conduit 3 is connected to means 8 for separating the mixture 2 into two opposite horizontal flows 6 and 7.

These two flows 6 and 7 enter the means 9a and 9b respectively that direct them toward the lower section 6 of the column 1.

Thanks to the means 8 for separating and the means 9a and 9b for directing, the liquid-vapor mixture that arrives radially into the column 1 is projected from top to bottom on the inner periphery of the column, where it separates into gas and liquid in the form of droplets. Thus, the upward move of the gas through the central section of the column is made easier and takes place with reduced entrainments of liquid droplets in relation to the radial feed of a column that has no introduction device.

Figure 2:
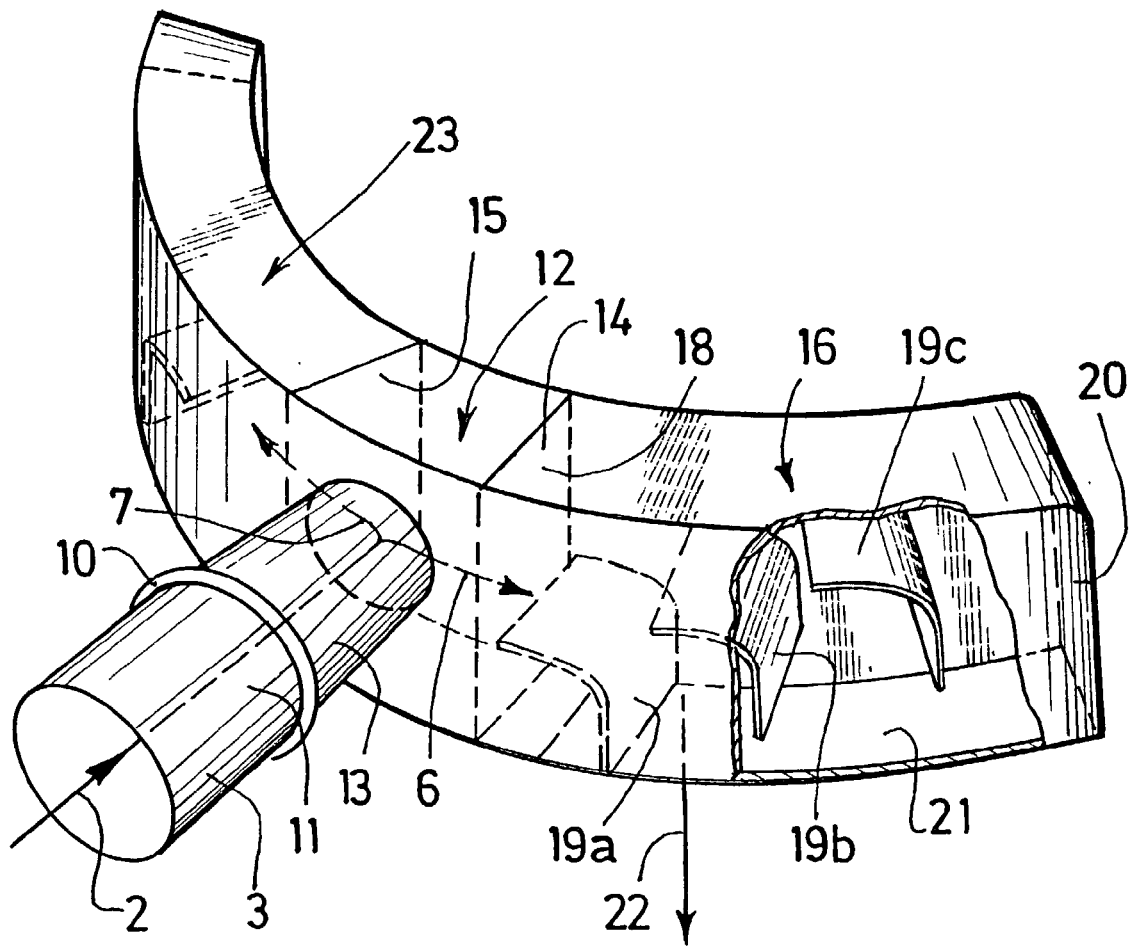
FIG. 2 represents a first method of execution of a device that is consistent with the invention.

According to a first method of execution of the device as set forth in the invention represented in FIG. 2, the liquid-vapor mixture 2 arrives through the column's radial feed conduit 3 (not represented in said FIG. 2). The conduit 3 is connected using a flange 10 to the entry 11 of the T-shaped defection box 12 that is comprised of a cylindrical shaped section 13, that corresponds to the vertical bar of the T, and a section that is more or less in the shape of a parallelepiped, that corresponds to the horizontal bar of the T. One of the open extremities of the cylindrical shaped section 13 makes up the entry 11 to the deflection box. The parallelepiped shaped section, has two empty faces that make up the exits 14 and 15 of the deflection box 12.

The liquid-vapor mixture 2 that arrives through the conduit 3 passes through the cylindrical section 13 of the deflection box 12 and enters into the parallelepiped shaped section, where it separates into two opposite horizontal flows 6 and 7 of the liquid vapor mixture.

The flow 6 of the liquid-vapor mixture enters into the distribution horn 16 through its open upstream extremity 18. Said horn 16 is in the shape of an arc of circle so as to take on the shape of the inner wall of the column, along which it is mounted horizontally, and it comprises, between its lateral walls, deflectors 19a, 19b and 19c.

The flow 6 is separated into several flows by the deflectors. The flows so formed are deflected by the deflectors' flat parts and by the downstream extremity 20 of the horn 16 and exit vertically from the latter through the open bottom 21 in the form of flows such as flow 22.

A second horn 23, placed symmetrically to the horn 16 in relation to the vertical plane that passes through the axis of the feed conduit 3, acts on the flow 7 in the same way as the horn 16.

Thanks to the device of the invention, the liquid vapor mixture is distributed inside the column in a homogenous manner in the form of droplets of liquid and gas, where they are animated with a vertical speed that favors the flowing of droplets on the periphery of the column towards its bottom section and the upward movement of the gas through the central section. The liquid-gas separation is thus ensured, and is translated by reduced entrainments of liquid droplets by the gas towards the column's upper section.

Figure 3:
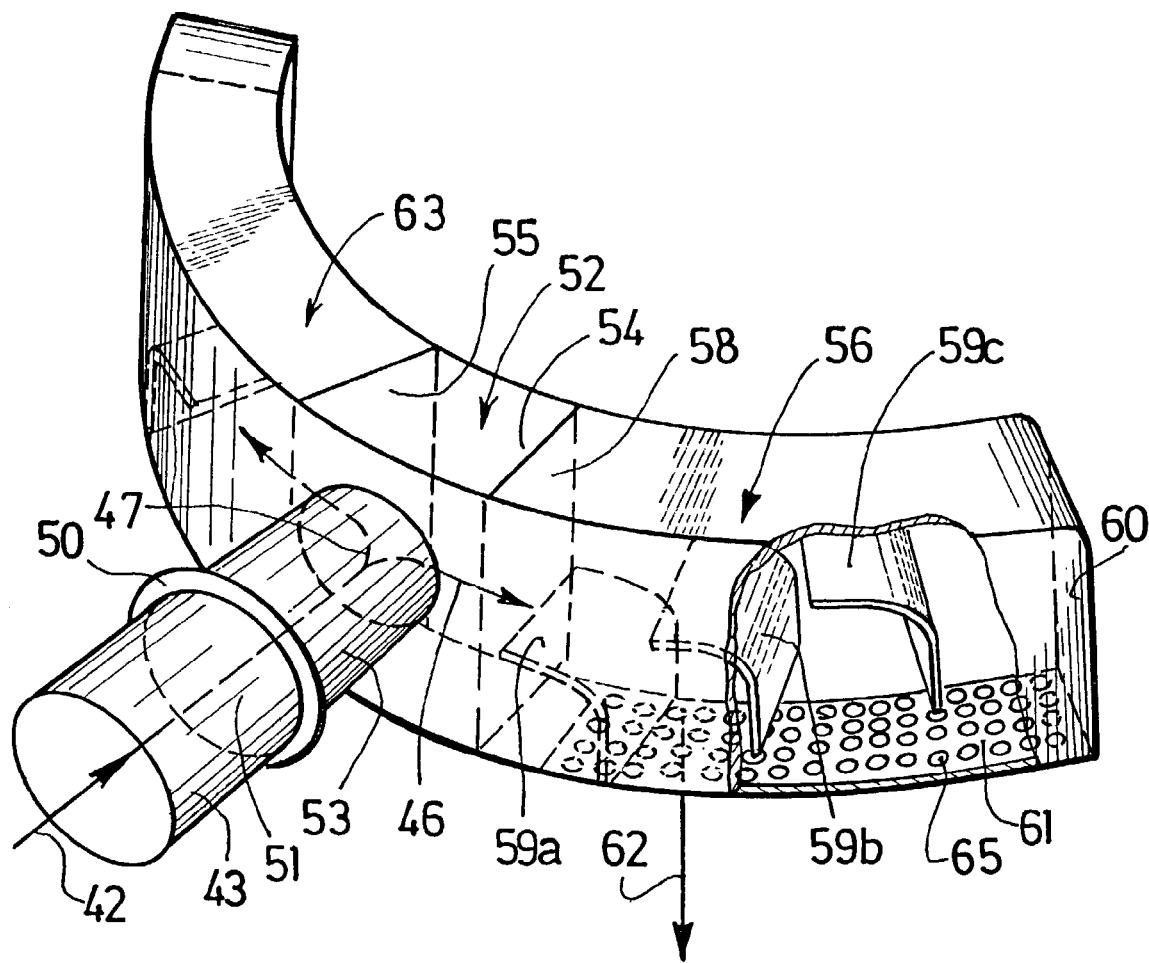
FIG. 3 represents a second method of execution of a device that is consistent with the invention.

According to a second method of execution of the invention's device represented in FIG. 3, the liquid-vapor mixture 42 arrives through the column's radial feed conduit 43 (not represented in said FIG. 3). The conduit 43 is connected using a flange 50 at the entry 51 of the T-shaped defection box 52, that is comprised of a cylindrical shaped section 53 that corresponds to the vertical bar of the T, and a more or less parallelepiped shaped section, that corresponds to the horizontal bar of the T. One of the open extremities of the cylindrical shaped section 53 constitutes the inlet 51 of the deflection box. The more or less parallelepiped shaped section has two empty faces that constitute the two outlets 54 and 55 of the deflection box 52.

The liquid-vapor mixture 42 that arrives through the conduit 43 passes through the cylindrical section 53 of the deflection box 52 and enters into the more or less parallelepiped shaped section, where it separates into two opposite and horizontal flows 46 and 47 of liquid-vapor mixture.

The flow 46 of liquid-vapor mixture enters into the distribution horn 56 by its open upstream extremity 58. Said horn 56 is in the shape of a arc of circle to take on the shape of the column's internal wall, along which is mounted, horizontally, and it is comprised, between its lateral walls, of deflectors 59a, 59b, and 59c.

The flow 46 is separated into several flows by the deflectors. The flows so formed are deflected by the vertical flat sections of the deflectors and by the downstream extremity 60 of the horn 56 and they exit vertically from the latter through the bottom 61 that presents several openings 65, in the form of flows such as flow 62.

A second horn 63 placed symmetrically to the horn 56 in relation to the vertical plane that passes through the axis of the feed conduit 43 acts on the flow 47 in the same manner as the horn 56.

As with the device as set forth in the first method of execution, the liquid-vapor mixture is distributed inside the column in homogenous manner in the form of liquid and gas droplets, and it is all animated by a vertical speed that favors the flowing of droplets at the periphery of the column toward its lower section and the upward movement of the gas through the central section. The liquid-gas separation is thus ensured, which is translated by reduced entrainments of liquid droplets by the gas toward the column's upper section.

Figure 4:
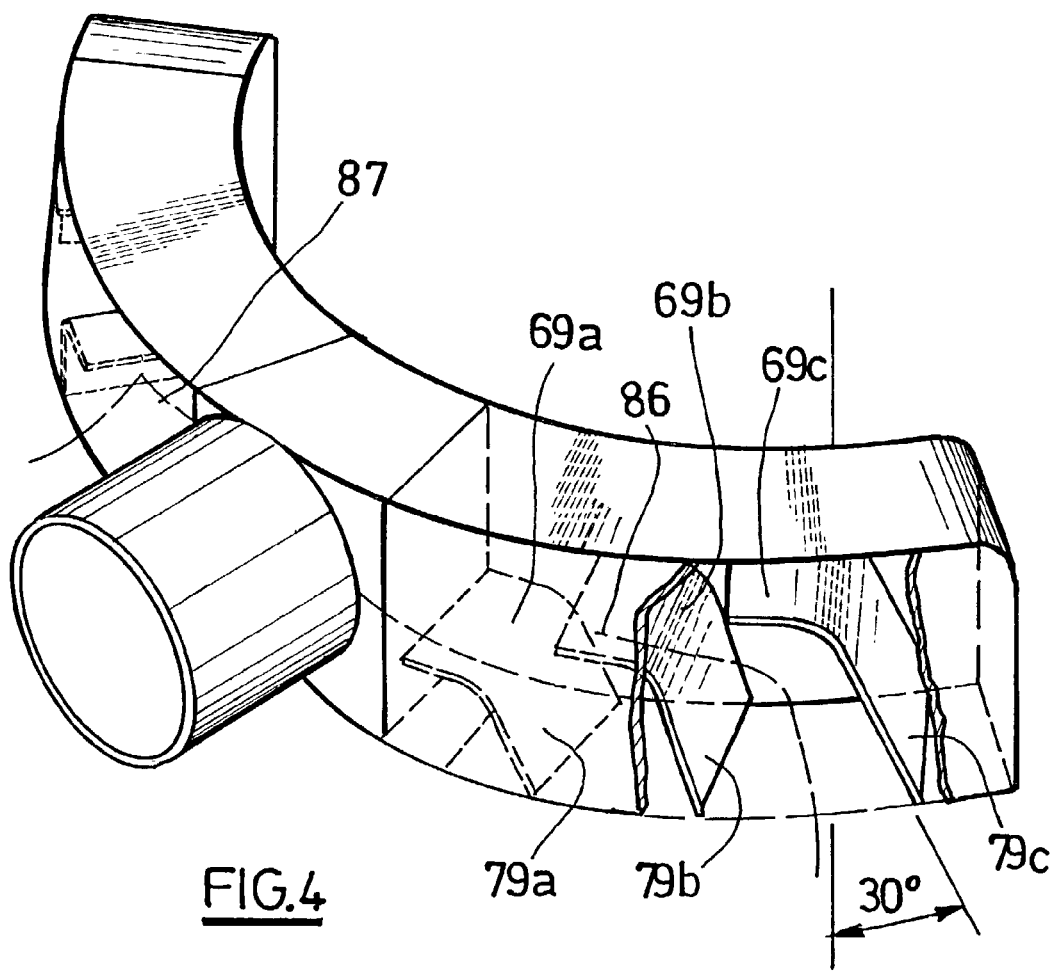
FIG. 4 represents a distribution horn equipped with deflectors, whose trailing edges are sloped in relation to the vertical line.

According to a method of execution represented in FIG. 4, the deflectors 69a, 69b and 69c have trailing edges 79a, 79b and 79c, sloped at a 30 degree angle in relation to the vertical line.

Thanks to the shape of these deflectors, the horizontal flows 86 and 87 are deflected progressively which makes it easier for them to flow and avoids breaking the droplets, which is translated by an additional decrease in the upward movement of the droplets into the column's wash-zone.

Figure 5:
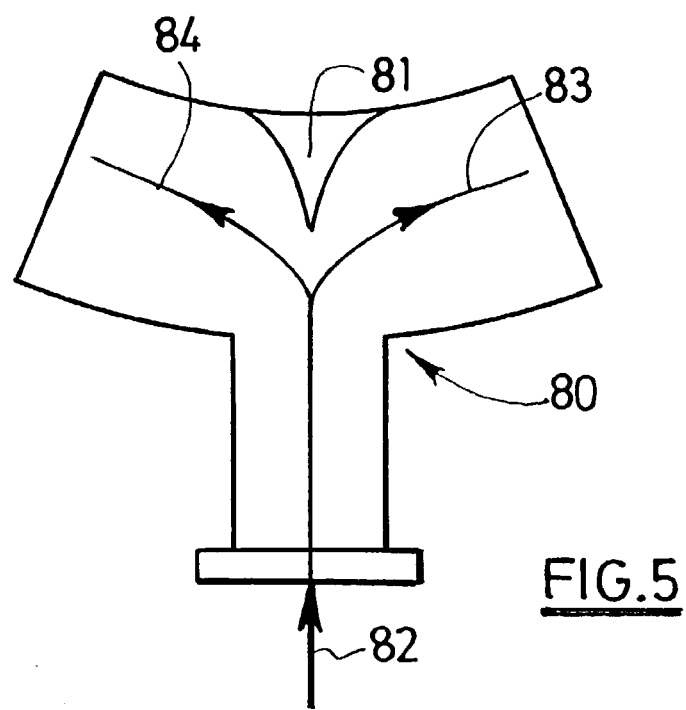
FIG. 5 represents a flow separator mounted in a deflection box.

FIG. 5 represents a sectional view of a deflection box 80 equipped with a deflector element 81 arranged in the liquid-vapor mixture flow's axis of penetration 82, that makes the formation of the two horizontal flows 83 and 94 easier.

For each of the methods of execution described above, the surface the invention's device occupies is less than 30% of the surface of the column's transition section which avoids strong overspeedings of the liquid-vapor mixture in the flash zone that favor the entrainment of droplets in the wash zone.

EXAMPLE

A means for appreciating the efficiency of the method and device of the invention consists in comparing the parameter values representative of the phenomenon of upward movement of liquid droplets calculated for a column equipped with a liquid-vapor mixture introduction device as set forth in the invention, with the same parameters calculated for the same column not so equipped.

As an example, we have chosen an atmospheric fractionating column of a viscosity breaking unit, with a total height of 33 m, an inner diameter of 2.47 m, where the charge is introduced radially at the height of 9 m through a conduit with a diameter of 457.2 mm, and the reference level is that of the bottom of the column.

The characteristics of the charge are provided in Table 1 below.

TABLE 1

Characteristics of the charge

| Parameters | Values |
| --- | --- |
| Rate | 3400 tons/day |
| Density of the gaseous phase | 5.9 kg/m$^3$ |

TABLE 1-continued

Characteristics of the charge

| Parameters | Values |
| --- | --- |
| Viscosity of the gaseous phase in the flash zone | 0.0141 mPa.s |
| Density of the liquid phase | 690 kg/m$^3$ |
| Viscosity of the liquid phase | 0.24 mPa.s |

In Table 2 hereafter we find the values of the average speed of the gaseous phase measured at 10, 11 and 12 meters and, in Table 3, the values of the average specific mass of the phase that it entrained in the form of droplets issued at the charge's point of entry.

TABLE 2

Average speed of the gaseous phase in meters per second

| Height in meters | Without an introduction device | With an introduction device as set forth in the invention |
| --- | --- | --- |
| 10 | 14.6 | 0.67 |
| 11 | 1.07 | 0.56 |
| 12 | 0.88 | 0.55 |

TABLE 3

Average specific mass of the phase entrained in the form of droplets issued at the point of entry of the charge in kg/m$^3$

| Height in meters | Without an introduction device | With an introduction device as set forth in the invention |
| --- | --- | --- |
| 9 | 0.770 | 0.130 |
| 10 | 0.291 | 0.088 |
| 11 | 0.111 | 0.044 |

It is obvious, when reading Tables 2 and 3, that the average speed of the gas and the average density of the droplets issued from the entry of the charge are greatly reduced at the various heights taken into consideration, thanks to the device of the invention and, therefore, that the entrainment of droplets of liquid toward the column's upper section are also reduced.

The invention claimed is:

1. Device for introducing a liquid-vapor mixture into a radial feed cylindrical fractionating column (1) comprised of a lower section (4) and an upper section (5), the device comprising:

means (8) for separating the liquid-vapor mixture (2) into two opposite and horizontal flows (6 and 7);

a first distribution horn (16) in the shape of an arc of circle, with an open upstream extremity (18) and bottom (21), arranged along the inner wall of the column and directed downward or arranged horizontally along the inner wall of the column; and a second distribution horn (23) in the form of an arc of circle, with an open upstream extremity and bottom, arranged along the inner wall of the column and directed downward or arranged horizontally along the inner wall of the column;

wherein the first distribution horn (16) and the second distribution horn (23) are placed symmetrically in relation to the vertical plane that passes through the axis of the feed conduit (3);

the upstream extremity of the first distribution horn (16) and the upstream extremity of the second distribution horn (23) are respectively connected to the means (8) for separating the flow of the liquid vapor mixture; and the first distribution horn (16) and the second distribution horn (23) further comprise a plurality of curved deflector elements (19*a*, 19*b*, 19*c*, 59*a*, 59*b*, 59*c*) mounted between opposite lateral walls of the first and second horns, arranged so that each deflector element deflects a portion of fluid toward the bottom (21, 61) of each horn to evenly distribute the fluid inside the column.

2. Device as set forth in claim 1, wherein the liquid-vapor mixture (2) arrives through a radial feed conduit (3), the means (8) for separating the liquid-vapor mixture are comprised of a deflection box (12) in the shape of a T, equipped with an inlet (11), a first and a second outlet (14, 15), symmetrical, where said deflection box (12) is connected by its inlet (11) to the feed conduit (3) and mounted so that the flows that pass through the first and the second outlets form two opposite and horizontal flows (6 and 7) of liquid-vapor mixture.

3. Device as set forth in claim 1, wherein the device further comprises a flow separator (81) placed inside the deflection box (80) in the axis of the feed conduit, so as to improve the separation of the two flows of the liquid-vapor mixture.

4. Device as set forth in claim 1, wherein the distribution horns are equipped with several deflectors (69*a*, 69*b*, 69*c*) whose upper edges are curved, where said deflectors are arranged so that their trailing edges (79*a*, 79*b*, 79*c*) are sloped at an angle that is less than 45 degrees in relation to the vertical line.

5. Device as set forth in claim 1, wherein the transition surface of the liquid-vapor mixture through the bottom (21) of each distribution horn (56, 63) is between 0.8 and 3 times the surface of the right section of the feed conduit (43).

* * * * *